(12) United States Patent
Takanashi

(10) Patent No.: US 7,712,355 B2
(45) Date of Patent: May 11, 2010

(54) DISPLACEMENT DETECTOR

(75) Inventor: Ryo Takanashi, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 452 days.

(21) Appl. No.: 11/793,178

(22) PCT Filed: Jan. 5, 2007

(86) PCT No.: PCT/JP2007/050366
§ 371 (c)(1),
(2), (4) Date: Jun. 13, 2007

(87) PCT Pub. No.: WO2007/097135
PCT Pub. Date: Aug. 30, 2007

(65) Prior Publication Data
US 2009/0249867 A1    Oct. 8, 2009

(30) Foreign Application Priority Data
Feb. 22, 2006    (JP) .............................. 2006-045334

(51) Int. Cl.
*G01B 5/28* (2006.01)
(52) U.S. Cl. ............................. 73/105; 73/104; 33/557; 33/560
(58) Field of Classification Search .................. 73/104, 73/105; 33/503, 552, 557, 558.2, 560
See application file for complete search history.

(56) References Cited
U.S. PATENT DOCUMENTS
3,283,568 A  *  11/1966   Reason .......................... 73/105

(Continued)

FOREIGN PATENT DOCUMENTS
JP      56-132502      10/1981

(Continued)

OTHER PUBLICATIONS

Patent Abstracts of Japan, Publication No. 56132502 A, Published on Oct. 16, 1981, in the name of Narimatsu.

(Continued)

*Primary Examiner*—Daniel S Larkin
(74) *Attorney, Agent, or Firm*—Christie, Parker & Hale LLP.

(57) ABSTRACT

A displacement detector capable of making a measurement in two directions of measurement 180 degrees different from each other without the need of a switching operation has been disclosed. This displacement detector comprises a contact arm 41 supported rotatably at a fulcrum of extension and rotation 43, first and second contacts 42A, 42B provided to the contact arm, first and second arms 21A, 21B each one end of which comes into contact with the contact arm 41, a first detection element 25 of the first arm, a second detection element 26 of the second arm, a detection section that detects the positional relationship between the first and second detection elements, a first biasing means 24A of the first arm, a second biasing means 24B of the second arm, a first stopper 30A of the first arm, and a second stopper 30B of the second arm, and a reference rotation position is a state in which the first and second arms are in contact with the first and second stoppers and also in contact with the contact arm, and when the contact arm rotates from the reference rotation position in a first or second direction, the first or second arm enters a free state.

4 Claims, 11 Drawing Sheets

U.S. PATENT DOCUMENTS

| | | | | |
|---|---|---|---|---|
| 4,637,119 A | * | 1/1987 | Schneider et al. | 483/69 |
| 4,669,300 A | * | 6/1987 | Hall et al. | 73/105 |
| 5,016,199 A | * | 5/1991 | McMurtry et al. | 702/168 |
| 6,622,114 B1 | * | 9/2003 | Szenger et al. | 702/158 |

FOREIGN PATENT DOCUMENTS

| | | |
|---|---|---|
| JP | 8-210804 | 8/1996 |
| JP | 2005-10019 | 1/2005 |

OTHER PUBLICATIONS

Patent Abstracts of Japan, Publication No. 08210804 A, Published on Aug. 20, 1996, in the name of Morita.

Patent Abstracts of Japan, Publication No. 2005010019 A, Published on Jan. 13, 2005, in the name of Hayashi et al.

* cited by examiner

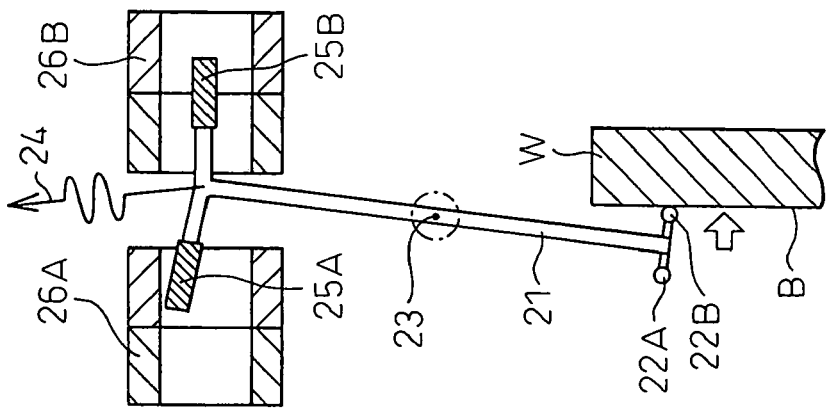
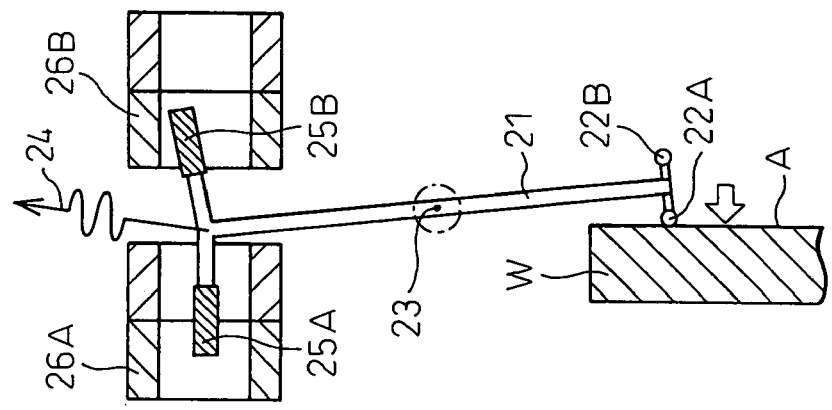
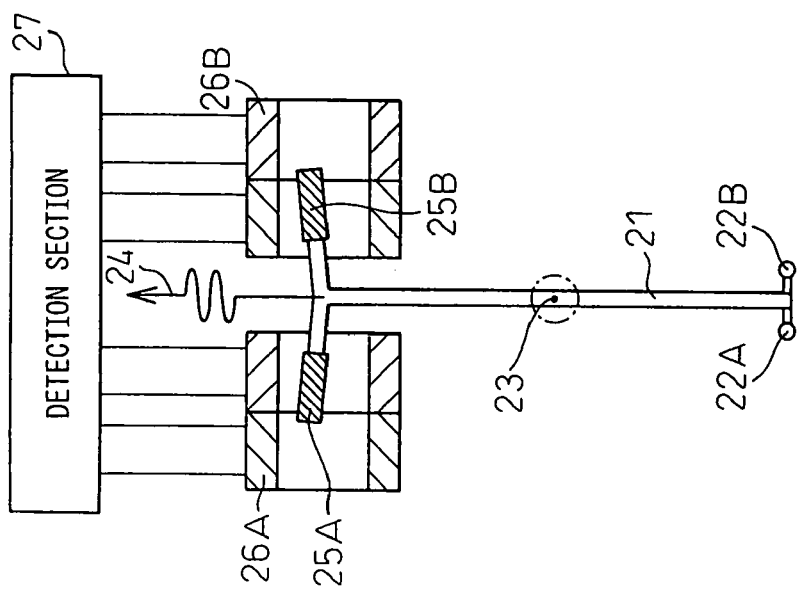

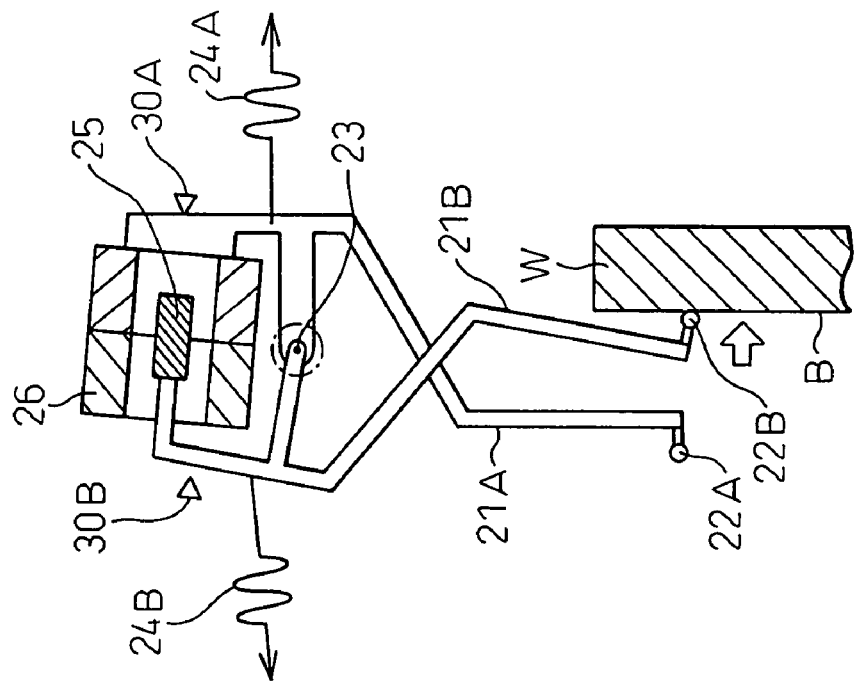
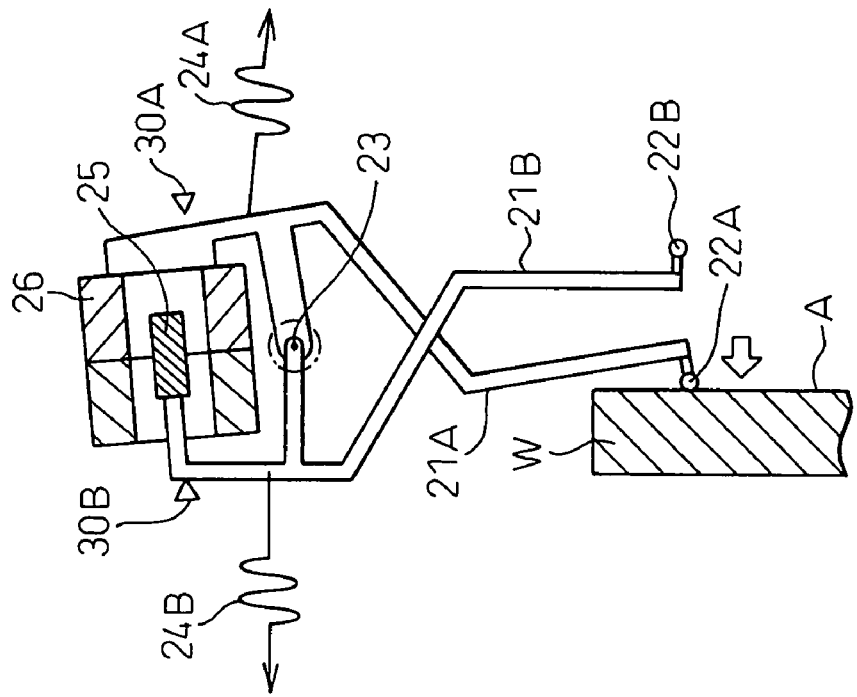

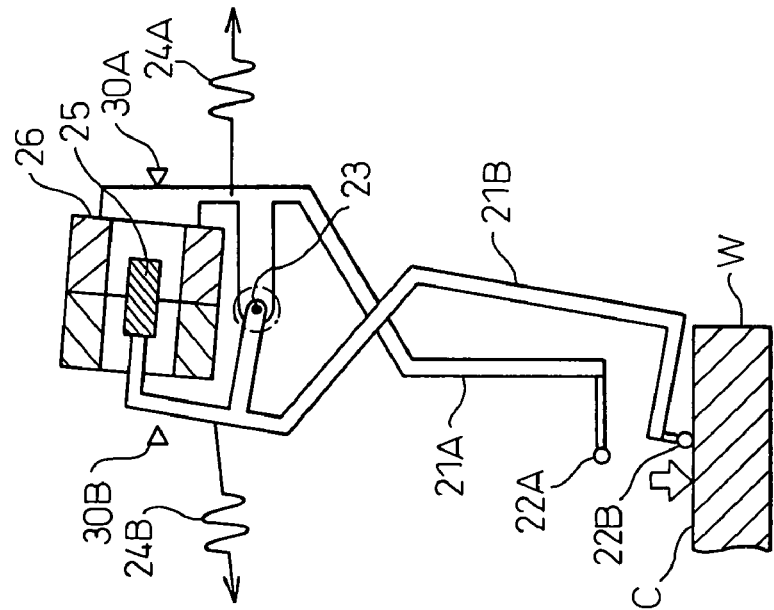
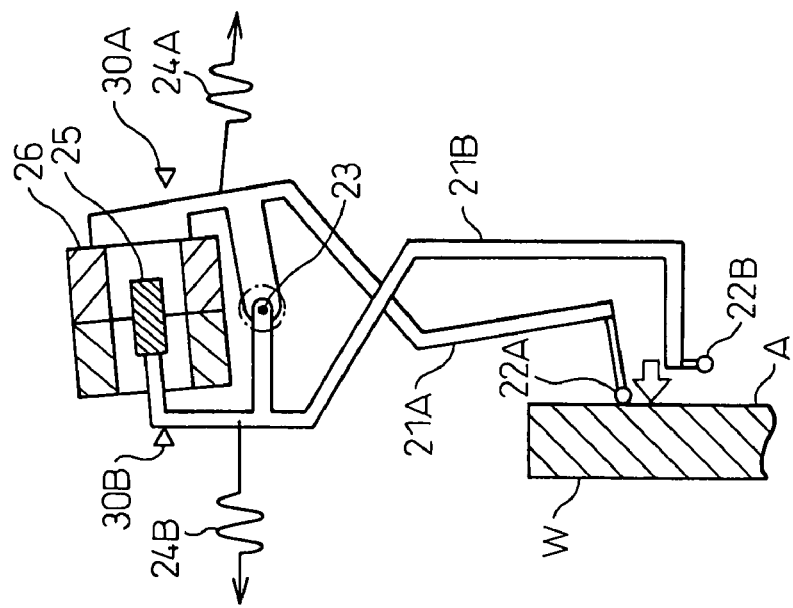

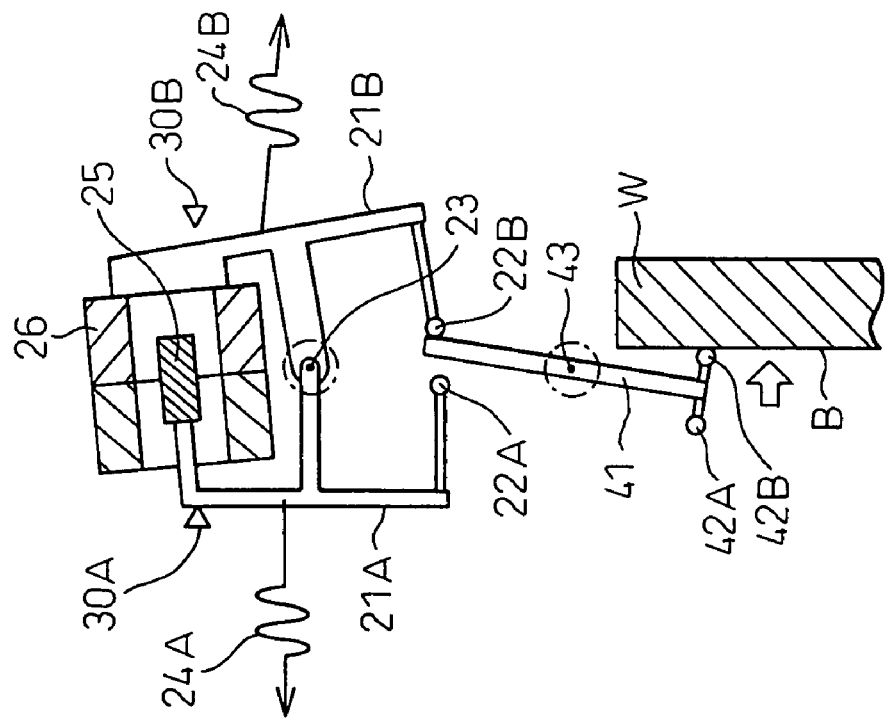
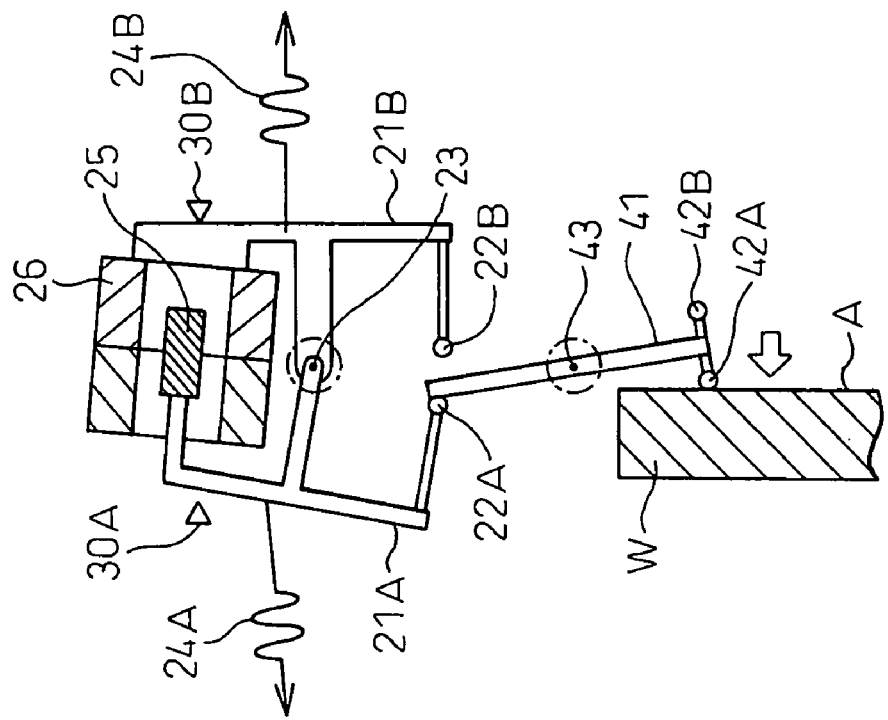

DISPLACEMENT DETECTOR

CROSS-REFERENCE TO RELATED APPLICATION

This application is a National Phase Patent Application of International Application Number PCT/JP2007/050366, filed on Jan. 5, 2007, which claims priority of Japanese Patent Application Number 2006-045334, filed on Feb. 22, 2006.

FIELD OF THE INVENTION

The present invention relates to a displacement detector used in an instrument for measuring roundness, a surface roughness/shape measuring instrument, etc., detecting the position (displacement) of a contact that comes into contact with the surface of a work, and more particularly, to a displacement detector the contacts of which extend in different directions and are capable of detecting the position of surfaces in different directions without the need to carry out a switching operation etc.

BACKGROUND OF THE INVENTION

In an instrument for measuring roundness, a surface roughness/shape measuring instrument, etc., the surface position of a work is detected by providing a contact at one end of an arm supported rotatably, biasing the arm so that the contact comes into contact with the surface of the work, and detecting the displacement of the other end of the arm. It is widely known that the displacement of the other end of the arm is detected by using a differential transformer system, in which a cylindrical iron core (core) is provided at the other end of the arm and two transformers are arranged continuously so that the core moves through the inside thereof accompanying the rotation, and is utilized when an alternating current signal is applied to one transformer, the alternating current signal induced at the other transformer changes depending on the position of the core, or a grating interference system in which movement accompanying the rotation of an optical grating provided at the other end of the arm is detected by an interferometer, etc. The present invention can be applied to any system as long as the system is provided with a contact at one end of an arm supported rotatably and detects the displacement of the other end. In the following explanation, a case is explained as an example, where the differential transformer system is used, however, the present invention is not limited to this.

FIG. 1A is a diagram showing a basic configuration of a displacement detector using a conventional differential transformer system. As shown in FIG. 1A, the displacement detector using the conventional differential transformer system has an arm 11 supported rotatably at the fulcrum of rotation 13, a contact 12 provided at a portion extending from one end of the arm 11, a spring that biases the arm 11 so that the contact 12 rotates toward the left side, a core 15 provided so that it moves on an arc with the fulcrum of rotation as its center from the other end of the arm 11 in accordance with the rotation of the arm, a cylindrical bobbin 16 provided so that the core 15 moves through the inside thereof, and a detection section 17 that applies a signal to the bobbin 16 and detects a signal that changes depending of the position of the core 15. Reference number 18 denotes a case in which the displacement detector and the fulcrum of rotation 13 is provided on the case 18, and spring 14 and bobbin 16 are fixed to the case 18. The detection section 17 is also provided on the case 18. In the following drawings, the case is not shown schematically for the purpose of simplification.

The bobbin 16 has at least two coils. When the detection section 17 applies an alternating current signal to at least one coil, the intensity of the alternating current signal induced at the rest of the coils changes monotonically depending on the position of the iron core (core) 15, and therefore, the detection section 17 detects the position of the core 15 in the bobbin 16 by detecting the intensity of the induced alternating current signal. The displacement detector using the differential transformer system is described in patent document 1, patent document 2, etc., and therefore, more explanation is omitted.

FIG. 1B is a diagram showing how the surface roughness etc. of surface A on the right side of a work W is measured using the displacement detector in FIG. 1A. As shown schematically, the displacement detector is moved to the right side of the work W and arranged so that the contact 12 comes into contact with the surface A on the right side of the work W. In this state, the arm 11 is biased by the spring 14 so that the contact 12 moves toward the left side and the contact 12 comes into contact with the surface A on the right side of the work W with a measurement pressure regulated by the spring 14. Then, when the work W or the displacement detector is moved in the vertical direction, the contact 12 is displaced in accordance with the surface shape of the surface A on the right side of the work W and the core 15 is displaced accordingly, and therefore, its displacement is detected.

The detection range in which the position of the core 15 in the bobbin 16 can be detected is a range in which the core 15 is in a predetermined positional relationship with respect to the bobbin 16. Consequently, in order to maximize the area of the surface of the work W in which the position can be detected, a setting is provided so that the average position of the work W on the surface corresponds to the middle in the predetermined positional relationship range. For example, when it is predicted that the surface A on the right side of the work W with which the contact 12 is in contact is the average position of the surface in FIG. 1B, the core 15 is arranged so that it is situated in the middle of the predetermined positional relationship range with respect to the bobbin 16.

FIG. 1C is a diagram explaining a case where surface B on the left side of the work W is measured using the displacement detector in FIG. 1A. The displacement detector in FIG. 1A has only one direction in which detection is possible, that is, the direction in which the left side of the contact 12 comes into contact with the work, and therefore, when the surface B on the left side of the work W is measured, the orientation of the entire displacement detector is changed by 180 degrees to reverse the direction of measurement and then the contact 12 is made to come into contact with the surface B on the left side of the work W. Such an operation is not only necessary in the case where the left and right surfaces of the work are measured, but also in the case where the surface and undersurface, the top and bottom surfaces, and the inner and outer diameters are measured.

When a measurement is made using the displacement detector as shown in FIG. 1A in a roundness measuring instrument, a surface roughness/shape measuring instrument, etc., in order to adjust the contact position between the contact 12 and the surface of the work, generally a work moving base that holds and moves the work, or a moving mechanism that holds and moves the displacement detector, that is, a moving mechanism that moves relative to the displacement detector with respect to the work is provided. Because of this, it is easy to move the displacement detector with respect to the work, however, it is complicated to rotate the displacement detector in order to measure a surface 180 degrees different as described above. For example, it is also possible to automatically change the measurement position by automatically controlling the movement by the moving mechanism, however, one more control system is required because a mechanism for rotating the displacement detector is provided. Under these circumstances, a displacement detector is needed, which is capable of measuring a surface 180 degrees in different directions without the need to rotate the displacement detector.

FIG. 2A is a diagram showing a basic configuration of a conventional displacement detector that meets such a need, and FIG. 2B and FIG. 2C are diagrams explaining the case where the left and right surfaces of the work W are measured.

As obvious from the comparison with FIG. 1A, the displacement detector in FIG. 2A differs from the basis configuration in FIG. 1A in that first and second contacts 12A and 12B extending in substantially 180 degrees in different directions are provided and at the same time, a rotation mechanism of the spring 14 that biases the arm 11 is provided so that the direction of biasing the arm 11 by the spring 14 can be changed by 180 degrees. Specifically, a member 19 that engages one end of the spring 14 is provided to the arm 11 and a mechanism that rotates a member 20 that engages the other end of the spring 14 is provided on the case.

As shown in FIG. 2B, when the surface A on the right side of the work W is measured, the rotation mechanism is set so that the spring 14 is situated on the right side of the arm 11 and the arm 11 is biased so that the contact 12A moves toward the left side, and then a measurement is made in the setting in which the contact 12A is in contact with the surface A on the right side of the work W.

As shown in FIG. 2C, when the surface B on the left side of the work W is measured, the rotation mechanism is set so that the spring 14 is situated on the left side of the arm 11 and the arm 11 is biased so that the contact 12B moves toward the right side, and then a measurement is made in the setting in which the contact 12B is in contact with the surface B on the left side of the work W.

The detection range is the same as that in the example in FIG. 1A.

Patent document 1: Japanese Unexamined Patent Publication (Kokai) No. H8-210804

Patent document 2: Japanese Unexamined Patent Publication (Kokai) No. 2005-10019

DISCLOSURE OF THE INVENTION

However, in the displacement detector shown in FIG. 2A, there is a problem in that it is necessary to change the direction of the spring 14 by operating the rotation mechanism in order to switch the directions of measurement and the operation of an operator or a mechanism in which automated operation is required.

In addition, there is also a problem in that the rotation mechanism is complicated and requires an amount of large space.

An object of the present invention is to solve these problems and realize a displacement detector capable of making a measurement in two different directions without the need of a switching operation.

A displacement detector according to a first aspect of the present invention is characterized by comprising: an arm supported rotatably at a fulcrum of rotation; first and second contacts extending in substantially 180 degrees in different directions from one end of the arm; first and second movable detection elements provided so that they extend substantially 180 degrees in different directions from the other end of the arm and move on an arc with the fulcrum of rotation as its center in accordance with the rotation of the arm; first and second fixed detection elements provided so that the respective relative positional relationships change in accordance with the movement of the first and second movable detection elements; a detection section that generates, when the first and second movable detection elements are within predetermined positional relationship ranges with respect to the first and second fixed detection elements, respectively, detection signals in accordance with the respective positional relationships; and an arm biasing means for biasing the arm so that it rotates toward a reference rotation position, the means biasing the arm in the opposite direction in accordance with the direction of rotation from the reference rotation position, wherein: when the arm rotates toward one side from the reference rotation position, the first movable detection element is within the predetermined positional relationship range with respect to the first fixed detection element and the detection section generates a detection signal in accordance with the positional relationship of the first movable detection element with respect to the first fixed detection element; and when the arm rotates toward the other side from the reference rotation position, the second movable detection element is within the predetermined positional relationship range with respect to the second fixed detection element and the detection section generates a detection signal in accordance with the positional relationship of the second movable detection element with respect to the second fixed detection element.

In addition, a displacement detector according to a second aspect of the present invention is characterized by comprising: an arm supported rotatably at a fulcrum of rotation; first and second contacts extending substantially 180 degrees in different directions from one end of the arm; a movable detection element provided at the other end of the arm so that it moves on an arc with the fulcrum of rotation as its center in accordance with the rotation of the arm; a fixed detection element provided so that the relative positional relationship changes in accordance with the movement of the movable detection element; a detection section that generates a detection signal in accordance with the positional relationship when the movable detection element is within a predetermined positional relationship range with respect to the fixed detection element; and an arm biasing means for biasing the arm so that it rotates toward a reference rotation position, the means biasing the arm in the opposite direction in accordance with the direction of rotation from the reference rotation position, wherein when the arm is at the reference rotation position, the movable detection element is situated substantially in the middle of the predetermined positional relationship range with respect to the fixed detection element.

In the first and second aspects of the present invention, the arm biasing means is provided, which biases the arm so that is rotates toward the reference rotation position and when the arm rotates from the reference rotation position, biasing the arm in the opposite direction depending on the direction of rotation. Due to this, it is possible to set the direction of measurement by causing the contact to come into contact with the work surface in a state in which the arm has been rotated clockwise or counterclockwise with respect to the reference rotation position.

As in the first aspect, two sets of movable detection elements corresponding to the core and a fixed detection element corresponding to the bobbin are provided and the displacement of the other end of the arm is detected by one of the sets when a measurement is made in one direction and the displacement of the other end of the arm is detected by the other set when a measurement is made in the other direction. In addition, as in the second aspect, a set of movable detection elements and a fixed detection element is provided and a setting is provided so that substantially the middle position in the predetermined positional relationship range of the movable detection element with respect to the fixed detection element, in which detection is possible by one set of movable detection elements and a fixed detection element, corresponds to the reference rotation position of the arm, and in half of the predetermined positional relationship range, the displacement of the other end of the arm is detected when a measurement is made in one direction, and in the other half of the predetermined positional relationship range, the displacement of the other end of the arm is detected when a measurement is made in the other direction. Consequently, when the same movable detection element (core) and the same fixed detection element (bobbin) are used in the first aspect and the second aspect, the detectable range in the second aspect is half or less than the detectable range in the first aspect.

Further, a displacement detector according to a third aspect of the present invention is characterized by comprising: first and second arms supported rotatably at a fulcrum of rotation; a first contact extending from one end of the first arm; a second contact extending from one end of the second arm; a first detection element provided at the other end of the first arm and moving on an arc with the fulcrum of rotation as its center in accordance with the rotation of the first arm; a second detection element provided at the other end of the second arm and moving on an arc with the fulcrum of rotation as its center so that the relative positional relationship changes with respect to the first detection element in accordance with the rotation of the second arm; a detection section that generates a detection signal in accordance with the positional relationship when the first detection element is within a predetermined positional relationship range with respect to the second detection element; a first biasing means for biasing the first arm toward the direction in which the first contact extends; a second biasing means for biasing the second arm toward the direction in which the second contact extends; a first stopper for limiting the range in which the first arm rotates using the first biasing means; and a second stopper for limiting the range in which the second arm rotates using the second biasing means, wherein: a reference rotation position is a state in which the rotation of the first arm is limited by the first stopper and the rotation of the second arm is limited by the second stopper; when the first arm rotates from the reference rotation position in the state in which the rotation of the second arm is limited by the second stopper, the positional relationship of the first detection element with respect to the second detection element is within the predetermined positional relationship range; and when the second arm rotates from the reference rotation position in the state in which the rotation of the first arm is limited by the first stopper, the positional relationship of the first detection element with respect to the second detection element is within the predetermined positional relationship range.

Furthermore, a displacement detector according to a fourth aspect of the present invention is characterized by comprising: a contact arm supported rotatably at a fulcrum of extension and rotation; first and second contacts extending in substantially 180 degrees in different directions from one end of the contact arm; first and second arms supported rotatably at a fulcrum of rotation and each one end of which comes into contact with the other end of the contact arm; a first detection element provided at the other end of the first arm and moving on an arc with the fulcrum of rotation as its center in accordance with the rotation of the first arm; a second detection element provided at the other end of the second arm and moving on an arc with the fulcrum of rotation as its center so that the relative positional relationship with respect to the first detection element changes in accordance with the rotation of the second arm; a detection section that generates a detection signal in accordance with the positional relationship when the first detection element is within a predetermined positional relationship range with respect to the second detection element; a first biasing means for biasing one end of the first arm toward a first direction; a second biasing means for biasing one end of the second arm toward a second direction; a first stopper for limiting the range in which the first arm rotates using the first biasing means; and a second stopper for limiting the range in which the second arm rotates using the second biasing means, wherein: a reference rotation position, at which one end of each of the first and second arms is in contact with the other end of the contact arm, is a state in which the rotation of the first arm is limited by the first stopper and the rotation of the second arm is limited by the second stopper; when the contact arm rotates from the reference rotation position toward a first direction, the other end of the contact arm rotates one end of the first arm toward a second direction and the positional relationship of the first detection element with respect to the second detection element is within the predetermined positional relationship range; and when the contact arm rotates from the reference rotation position toward the second direction, the other end of the contact arm rotates one end of the second arm toward the first direction and the positional relationship of the first detection element with respect to the second detection element is within the predetermined positional relationship range.

In the third aspect of the present invention, the first detection element (core) and the second detection element (bobbin) are provided respectively to the first arm and the second arm supported rotatably at the fulcrum of rotation, and therefore, when the first arm rotates, or when the second arm rotates, the mutual positional relationship between the first detection element and the second detection element changes. If contacts having opposite detection directions are provided to one end of the first arm and the second arm, respectively, a measurement system with 180 degrees in different directions of measurement can be realized. The state in which the first stopper comes into contact with the first arm to limit its rotation and the second stopper comes into contact with the second arm to limits its rotation is assumed to be the reference rotation position and when the first arm rotates from the reference rotation position in the state in which the second stopper limits the rotation of the second arm, only a first measurement system can rotate and make a measurement, and in the state in which the first stopper limits the rotation of the first arm, when the second arm rotates from the reference rotation position, only a second measurement system can rotate and make a measurement.

In the fourth aspect of the present invention, the contact arm supported rotatably at the fulcrum of extension and rotation is provided in the third configuration, and the first and second contacts are provided at one end of the contact arm and each one end of the first and second arms comes into contact with the other end of the contact arm. Then, the state in which one end of the first arm and one end of the second arm are in contact with the other end of the contact arm is assumed to be the reference rotation position. When the contact arm rotates in the first direction from the reference rotation position, the first arm rotates and separates from the first stopper, entering a free state, and only the first measurement system can make a measurement, and when the contact arm rotates in the second direction from the reference rotation position, the second arm rotates and separates from the second stopper, entering a free state, and only the second system can make a measurement.

According to the present invention, it is possible to set the direction of measurement by causing the first or second contact to come into contact with the surface of the work and the displacement detector capable of making a measurement in two different directions without the need of a switching operation is realized.

BRIEF DESCRIPTION OF THE DRAWINGS

FIG. 3A to FIG. 3C are schematic configuration diagrams of a displacement detector in a first embodiment of the present invention and explanatory diagrams of its use;

FIG. 7A and FIG. 7B are explanatory diagrams of the use of the displacement detector in the third embodiment;

FIG. 9A and FIG. 9B are explanatory diagrams of the use of a modification example of the displacement detector in the third embodiment;

FIG. 11A and FIG. 11B are explanatory diagrams of the use of the displacement detector in the fourth embodiment.

Figure 1A:
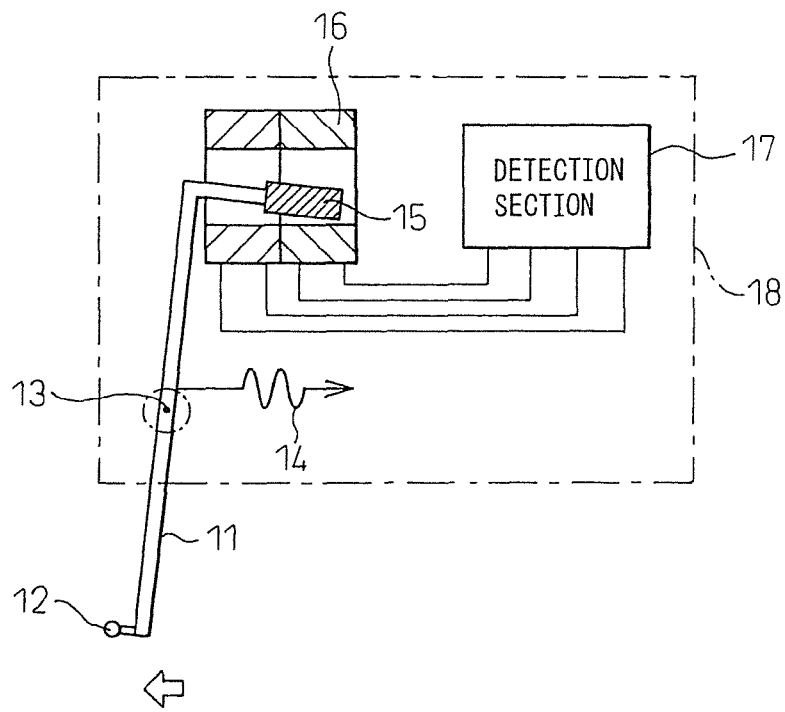
FIG. 1A to FIG. 1C are schematic configuration diagrams of a conventional example of a displacement detector and explanatory diagrams of its use.
Figure 1B:
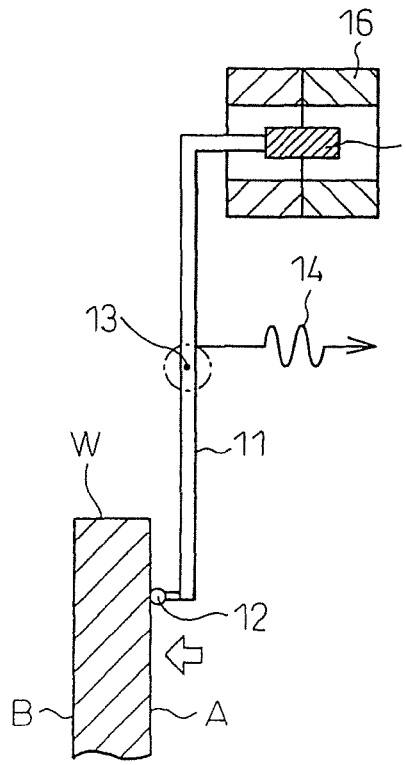
Figure 1C:
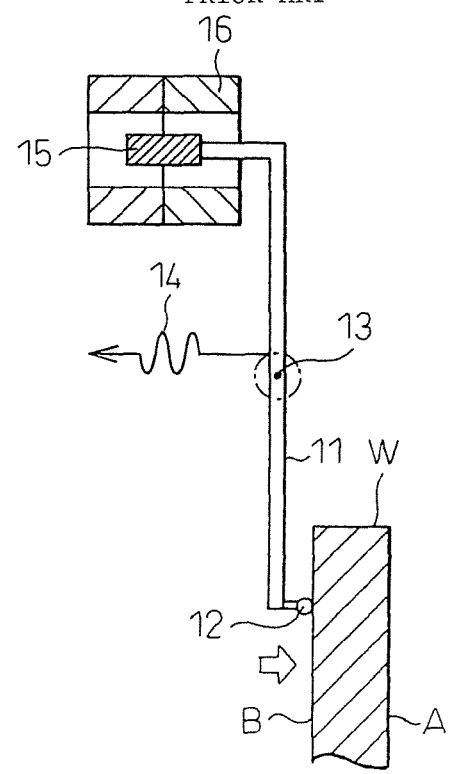
Figure 2A:
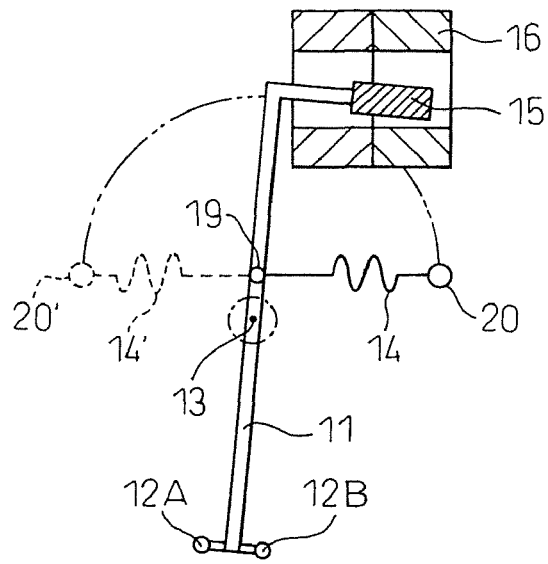
FIG. 2A to FIG. 2C are schematic configuration diagrams of another conventional example of a displacement detector and explanatory diagrams of its use.
Figure 2B:
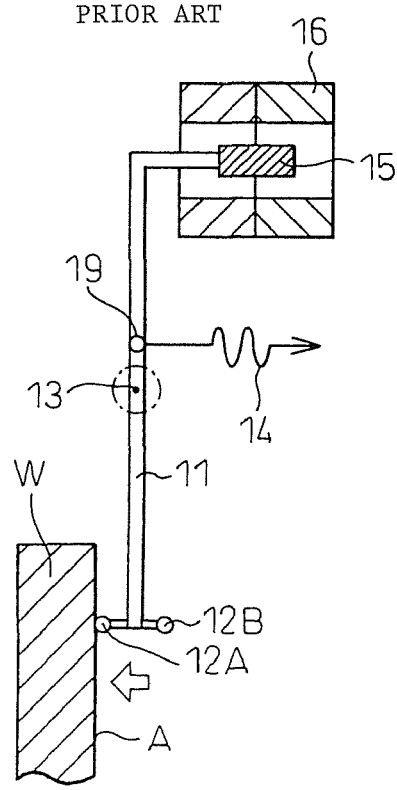
Figure 2C:
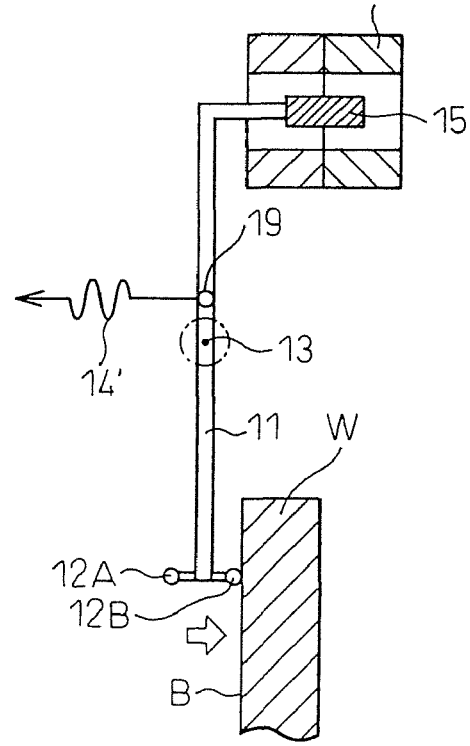

21 arm
22A first contact
22B second contact
23 fulcrum of rotation
24 spring (biasing means)
25, 25A, 25B core (detection element)
26, 26A, 26B bobbin (detection element)
27 detection section

DESCRIPTION OF THE PREFERRED EMBODIMENTS

FIG. 3A is a diagram showing a schematic configuration of a displacement detector in a first embodiment of the present invention and FIG. 3B and FIG. 3C are diagrams showing its use.

As shown in FIG. 3A, the displacement detector in the first embodiment has an arm 21 supported rotatably at a fulcrum of rotation, a first contact 22A and a second contact 22B provided that they extend 180 degrees in different directions from one end of the arm 21, a first core (first movable detection element) 25A and a second core (second movable detection element) 25B provided so that they extend substantially 180 degrees in different directions from the other end of the arm 21 and moving on an arc with the fulcrum of rotation 23 as its center in accordance with the rotation of the arm 21, a cylindrical first bobbin (first fixed detection element) 26A and a cylindrical second bobbin (second fixed detection element) 26B provided so that the first core 25A and the second core 25B move through the inside thereof, a spring 24 engaged with the other end of the arm 21, and a detection section 27 that generates a signal in accordance with the position of the first core 25A inside the first bobbin 26A and a signal in accordance with the position of the second core 25B inside the second bobbin 26B. The first and second cores 25A and 25B are iron cores similar to that in the conventional example, the first and second bobbins 26A and 26B are constituted by two or more coils as in the conventional example, and the detection section 27 detects the position of the first core 25A inside the first bobbin 26A and the position of the second core 25B inside the second bobbin 26B by the same principle as that in the conventional example.

Here, the state shown in FIG. 3A is referred to as a reference rotation position. The spring 24 is arranged so that it is situated on a line that connects the portion at which the spring 24 is engaged with the other end of the arm 21 and the fulcrum of rotation 23 at the reference rotation position. Consequently, when the arm 21 rotates from the reference rotation position, the spring 24 biases the arm 21 so that it returns to the reference rotation position. For example, when the contact 22A rotates so that it moves toward the right side, the spring 24 applies force to the arm 21 so that the contact 22A moves toward the left side. On the contrary, when the contact 22B rotates so that it moves toward the left side, the spring 24 applies force to the arm 21 so that the contact 22B moves toward the right side. In other words, the spring 24 biases the arm 21 in opposite directions in accordance with the direction of rotation from the reference rotation position.

A displacement detector employing the difference transformer system using a core (iron core) and a bobbin (two or more coils) has a detectable range in which the position of a core inside a bobbin can be detected. For example, when a bobbin consists of two coils, it is necessary for at least part of the core to be situated inside both the coils. Similarly, other detection systems, such as the grating interferometer system, have a detectable range. A first differential transformer consisting of the first core 25A and the first bobbin 26A is set so that it is situated near one limit (or it may be situated outside the detectable range) of the detectable range when at the reference rotation position and it approaches the middle of the detectable range when the arm 21 rotates so that the contact 22A moves toward the right side. Then, a second differential transformer consisting of the second core 25B and the second bobbin 26B is set so that it is situated near one limit (or it may be situated outside the detectable range) of the detectable range when at the reference rotation position and it approaches the middle of the detectable range when the arm 21 rotates so that the contact 22B moves toward the left side.

When the surface roughness or surface shape of the surface A on the right side of the work W is measured using the displacement detector in the first embodiment, a setting is provided so that the contact 22A comes into contact with the surface A on the right side of the work W in a state in which the arm 21 has rotated so that the contact 22A moves toward the right side from the reference rotation position, as shown in FIG. 3B. In this setting, the spring 24 biases the arm 21 so that the contact 22A moves toward the left side. The biasing force serves as a contact pressure of the contact 22A against the surface A. This state is within the detectable range of the first differential transformer consisting of the first core 25A and the first bobbin 26A and the position of the first core 25A inside the first bobbin 26A, that is, the angle of rotation of the arm 21, and further, that is, the position (displacement) of the contact 22A, is detected by the first differential transformer. At this time, the second differential transformer consisting of the second core 25B and the second bobbin 26B is outside the detectable range and its signal is ignored.

When the surface roughness or surface shape of the surface B on the left side of the work W is measured, a setting is provided so that the contact 22B comes into contact with the surface B on the left side of the work W in a state in which the arm 21 has rotated so that the contact 22B moves toward the left side from the reference rotation position, as shown in FIG. 3C. In this setting, the spring 24 biases the arm 21 so that the contact 22B moves toward the right side. The biasing force serves as a contact pressure of the contact 22B against the surface B. This state is within the detectable range of the second differential transformer consisting of the second core 25B and the second bobbin 26B and the position of the second core 25B inside the second bobbin 26B, that is, the angle of rotation of the arm 21, and further, that is, the position (displacement) of the contact 22B, is detected by the second differential transformer. At this time, the first differential transformer consisting of the first core 25A and the first bobbin 26A is outside the detectable range and its signal is ignored.

As explained above, with the displacement detector in the first embodiment, it is possible to set the direction of measurement by causing the contact to come into contact with the work surface in the state in which the arm 21 has been rotated clockwise or counterclockwise with respect to the reference rotation position. Both of the differential transformers are outside the detectable range when the arm 21 is at the reference rotation position, the arm 21 is not used for measurement when it is in the vicinity of the reference rotation position and the detectable range is from a position to which the arm 21 has been rotated more or less from the reference rotation position when the arm 21 is rotated in either direction. In this case, when within the detectable range, the contact 22A or 22B comes into contact with a surface to be measured with a contact pressure equal to or higher than a certain value without fail.

Figure 4:
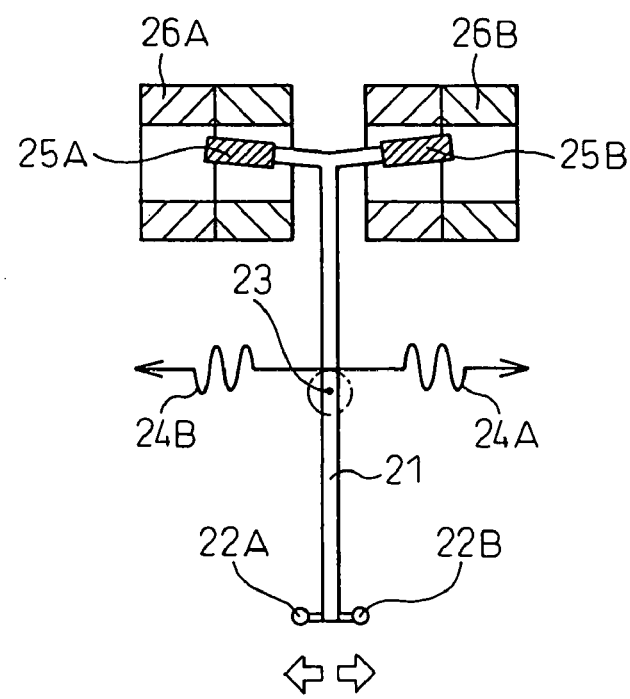
FIG. 4 is a diagram showing a modification example of the displacement detector in the first embodiment.

In the displacement detector in the first embodiment shown in FIG. 3A, the biasing means that biases the arm 21 so that it returns to the reference rotation position is realized by the spring 24 arranged so as to be situated on a line connecting the portion at which the spring 24 is engaged with the other end of the arm 21 and the fulcrum of rotation 23 at the reference rotation position, however, it is also possible to realize the biasing means using another configuration. FIG. 4 shows a modification example in which such a biasing means is realized using another configuration.

In the modification example shown in FIG. 4, instead of the spring 24, two springs 24A and 24B having the same characteristics are used and the spring 24A is engaged with the arm 21 so that it applies a rotation moment in the transverse (rightward) direction and the spring 24B is engaged with the same portion of the arm 21 so that it applies a rotation moment in the opposite (leftward) direction. At the reference rotation position, the rotation moments by the two springs 24A and 24B come into a balanced state. When the arm 21 rotates from the reference rotation position so that the contact 22A moves toward the right side, the spring 24A is stretched and the rotation moment to be applied increases, and the spring 24B is compressed and the rotation moment to be applied decreases, and therefore, a biasing force is applied to rotate the arm 21 so that the contact 22A moves toward the left side. When the arm 21 rotates from the reference rotation position so that the contact 22B moves toward the left side, the spring 24B is stretched and the rotation moment to be applied increases, and the spring 24A is compressed and the rotation moment to be applied decreases, and therefore, a biasing force is applied to rotate the arm 21 so that the contact 22B moves toward the right side.

Figure 5A:
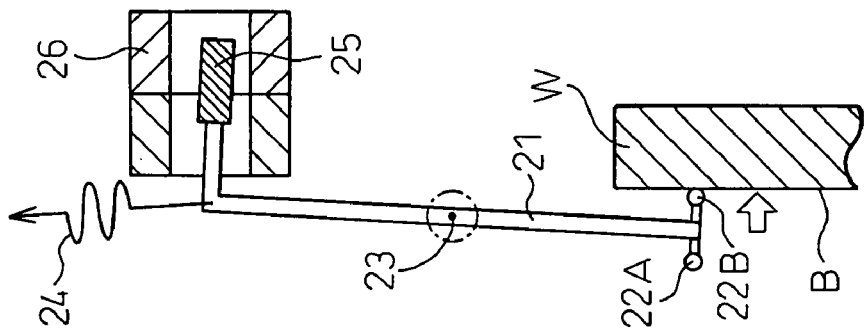
FIG. 5A to FIG. 5C are schematic configuration diagrams of a displacement detector in a second embodiment of the present invention and explanatory diagrams of its use.
Figure 5B:
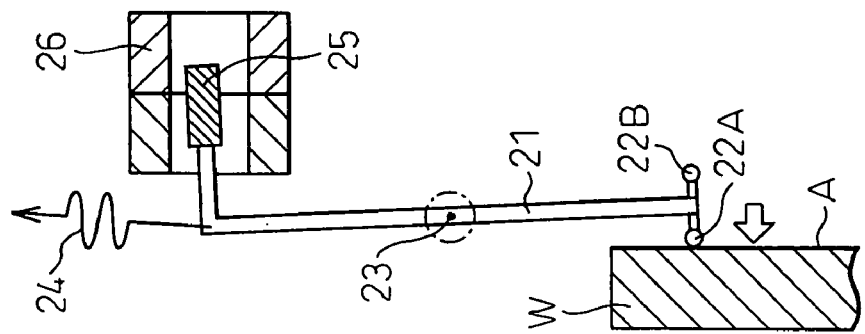
Figure 5C:
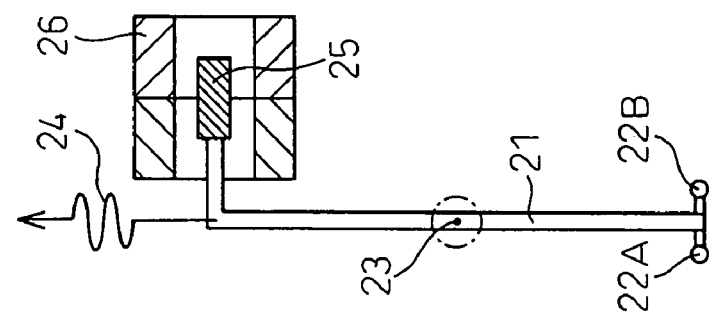

FIG. 5A is a diagram showing a schematic configuration of a displacement detector in a second embodiment of the present invention, and FIG. 5B and FIG. 5C are diagrams showing how it is used.

The difference is that while the displacement detector in the first embodiment uses two differential transformers, the displacement detector in the second embodiment uses only one differential transformer. Specifically, the displacement detector in the second embodiment has the arm 21 supported rotatably at the fulcrum of rotation 23, the first contact 22A and the second contact 22B provided so that they extend in 180 degrees different directions from one end of the arm 21, a core 25 provided that is extends from the other end of the arm 21 and moving on an arc with the fulcrum of rotation 23 as its center in accordance with the rotation of the arm 21, a bobbin 26 provided so that the core 25 moves through the inside thereof, and the spring 24 engaged with the other end of the arm 21. The detection section is not shown schematically.

As in the first embodiment, the spring 24 is arranged so that it is situated on a line that connects the portion at which the spring 24 is engaged with the other end of the arm 21 and the fulcrum of rotation 23 at the reference rotation position, and when the arm 21 rotates from the reference rotation position, the spring 24 biases the arm 21 so that it returns to the reference rotation position. The differential transformer consisting of the core 25 and the bobbin 26 is set so that it is situated in the middle of the detectable range when the arm 21 is at the reference rotation position.

When the surface A on the right side of the work W is measured, a setting is provided so that the contact 22A comes into contact with the surface A on the right side of the work W in a state in which the arm 21 has rotated so that the contact 22A moves toward the right side from the reference rotation position, as shown in FIG. 5B. In this setting, the spring 24 biases the arm 21 so that the contact 22A moves toward the left side. The biasing force serves as a contact pressure of the contact 22A against the surface A. This state is in a range shifted to one side from the middle of the detectable range of the differential transformer and the position of the core 25 inside the bobbin 26, that is, the angle of rotation of the arm 21, and further, that is, the position (displacement) of the contact 22A, is detected by the differential transformer.

When the surface B on the left side of the work W is measured, a setting is provided so that the contact 22B comes into contact with the surface B on the left side of the work W in a state in which the arm 21 has rotated so that the contact 22B moves toward the left side from the reference rotation position, as shown in FIG. 5C. In this setting, the spring 24 biases the arm 21 so that the contact 22B moves toward the right side. The biasing force serves as a contact pressure of the contact 22B against the surface B. This state is in a range shifted to the other side from the middle of the detectable range of the differential transformer and the position of the core 25 inside the bobbin 26, that is, the angle of rotation of the arm 21, and further, that is, the position (displacement) of the contact 22B, is detected by the differential transformer.

As described above, with the displacement detector in the second embodiment, it is possible to set the direction of measurement by causing the contact to come into contact with the work surface in the state in which the arm 21 has been rotated clockwise or counterclockwise with respect to the reference rotation position. However, the detectable range of one differential transformer is divided into two and one of the divided ranges is used to detect a displacement when the arm 21 is rotated to one side from the reference rotation position and the other divided range is used to detect a displacement when the arm 21 is rotated to the other side from the reference rotation position, and therefore, if the detectable range of the differential transformer is the same, the detectable range is half or less than that in the first embodiment.

Figure 6:
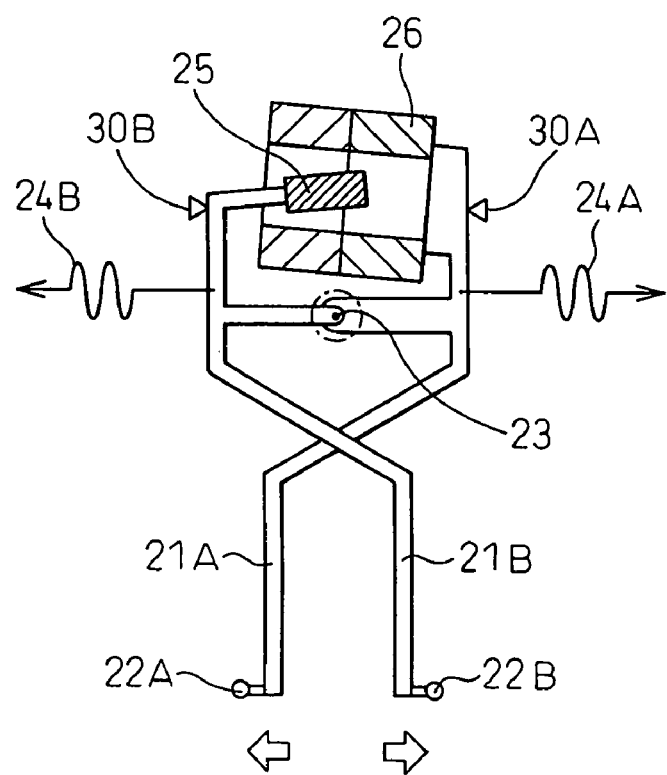
FIG. 6 is a schematic configuration diagram of a displacement detector in a third embodiment of the present invention.

FIG. 6 is a diagram showing a schematic diagram of a displacement detector in a third embodiment of the present invention and FIG. 7A and FIG. 7B are diagrams showing how it is used.

As shown in FIG. 6, the displacement detector in the third embodiment of the present invention comprises first and second arms 21A and 21B supported rotatably at the fulcrum of rotation 23, the first contact 22A extending from one end of the first arm 21A in the direction of a tangent to an arc with the fulcrum of rotation 23 as its center, a second contact 22B extending from one end of the second arm 21B in the direction of a tangent to an arc with the fulcrum of rotation 23 as its center but in the opposite direction to that of the first contact 22A, the bobbin (first detection element) 26 provided at the other end of the first arm 21A and moving on an arc with the fulcrum of rotation 23 as its center in accordance with the rotation of the first arm 21A, the core (second detection element) 25 provided at the other end of the second arm 21B and moving on an arc with the fulcrum of rotation 23 as its center in accordance with the rotation of the second arm 21B, the first spring 24A that biases the first arm 21A toward the direction in which the first contact 22A extends, the second spring 24B that biases the second arm 21B toward the direction in which the second contact 22B extends, a first stopper 30A that limits the range in which the first arm 21A rotates using the first spring 24A, and a second stopper 30B that limits the range in which the second arm 21B rotates using the second spring 24B. The detection section that generates a signal to detect the position of the core 25 with respect to the bobbin 26 in the differential transformer consisting of the core 25 and the bobbin 26 is not shown schematically.

Although the first arm 21A and the second arm 21B intersect each other, this is because the contacts 22A and 22B extend outwardly, respectively, and when extending inwardly, they need not intersect each other.

In the third embodiment, a state in which the first arm 21A shown in FIG. 6 is in contact with the first stopper 30A and the second arm 21B is in contact with the second stopper 30B is referred to as a reference rotation position. It is possible for the first arm 21A to rotate so that the contact 22A moves from the reference rotation position toward the right side. In addition, it is possible for the second arm 21B to rotate so that the contact 22B moves from the reference rotation position toward the right side.

The differential transformer consisting of the core 25 and the bobbin 26 is set so that it is near the end of the detectable range when the arms 21A and 21B are at the reference rotation position and moves toward the middle of the detectable range when the arm 21A or the arm 21B rotates from the reference rotation position.

When the surface roughness or surface shape of the surface A on the right side of the work W is measured using the displacement detector in the third embodiment, a setting is provided so that the contact 22A comes into contact with the surface A on the right side of the work W in a state in which the first arm 21A has rotated so that the contact 22A moves toward the right side from the reference rotation position, as shown in FIG. 7A. In this setting, the spring 24A biases the first arm 21A so that the contact 22A moves toward the left side. The biasing force serves as a contact pressure of the contact 22A against the surface A. At this time, the second arm 21B is in contact with the stopper 30B and in a state in which it remains at the reference rotation position, not moving therefrom. This state is within the detectable range of the differential transformer consisting of the core 25 and the bobbin 26 and the position of the bobbin 26 with respect to the core 25, that is, the angle of rotation of the first arm 21A, and further, that is, the position (displacement) of the contact 22A, is detected by the differential transformer.

When the surface roughness or surface shape of the surface B on the left side of the work W is measured, a setting is provided so that the contact 22B comes into contact with the surface B on the left side of the work W in a state in which the second arm 21B has rotated so that the contact 22B moves toward the left side from the reference rotation position, as shown in FIG. 7B. In this setting, the spring 24B biases the second arm 21B so that the contact 22B moves toward the right side. The biasing force serves as a contact pressure of the contact 22B against the surface B. At this time, the first arm 21A is in contact with the stopper 30A and in a state in which it remains at the reference rotation position, not moving therefrom. This state is also within the detectable range of the differential transformer consisting of the core 25 and the bobbin 26 and the position of the core 25 inside the bobbin 26, that is, the angle of rotation of the second arm 21B, and further, that is, the position (displacement) of the contact 22B, is detected by the differential transformer.

As explained above, with the displacement detector in the third embodiment, it is possible to set the measurement direction by causing the contact to come into contact with the work surface in a state in which while one of the first arm 21A and the second arm 21B is held at the reference rotation position, the other has been rotated in a predetermined direction with respect to the reference rotation position. The detectable range of the displacement detector in the third embodiment is the detectable range of the differential transformer consisting of the core 25 and the bobbing 26 when whichever of the first arm 21A and the second arm 21B is used.

Figure 8:
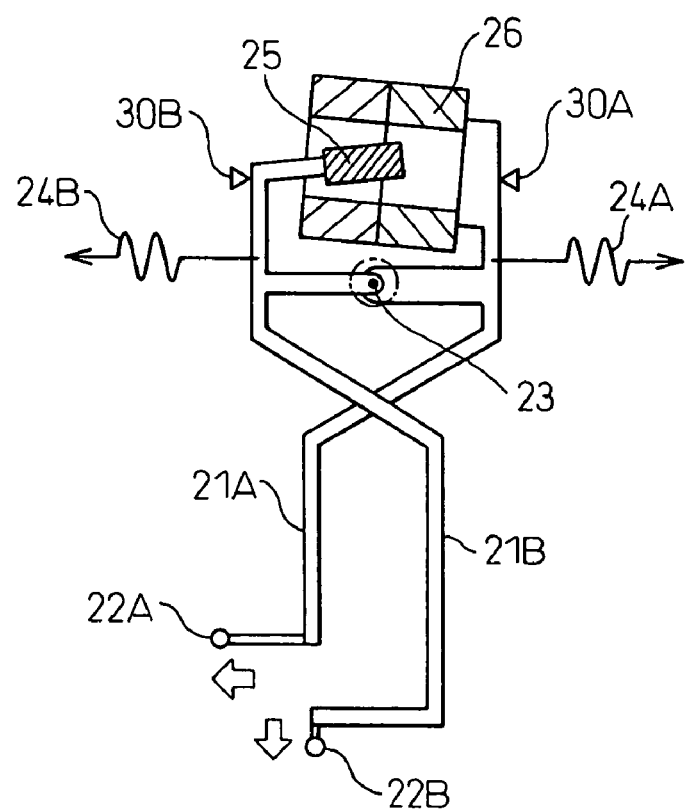
FIG. 8 is a schematic configuration diagram of a modification example of the displacement detector in the third embodiment.

FIG. 8 is a diagram showing a schematic configuration of a modification example of the displacement detector in the third embodiment. As shown in FIG. 8, the modification example differs from the displacement detector in the third embodiment in that one end of the second arm 21B is extended more or less and then it is bent in the direction in which the first contact 22A extends and further the second contact 22B is extended from its front end in the direction perpendicular to the direction in which the first contact 22A extends, and other portions are the same as those in the third embodiment. In the modification example, it is possible to measure the surface on the right side and the top surface of the work without changing the orientation of the displacement detector.

FIG. 9A and FIG. 9B are diagrams for explaining how to use the modification example in FIG. 8. As shown in FIG. 9A, when the surface roughness or surface shape of the surface A on the right side of the work W is measured, the same measurement is made as in FIG. 7A. When the surface roughness or surface shape of the surface C on the upper side of the work W is measured, the second contact 22B is caused to come into contact with the surface C as shown in FIG. 9B. The operation is the same as that in FIG. 7B and therefore its explanation is omitted.

Figure 10:
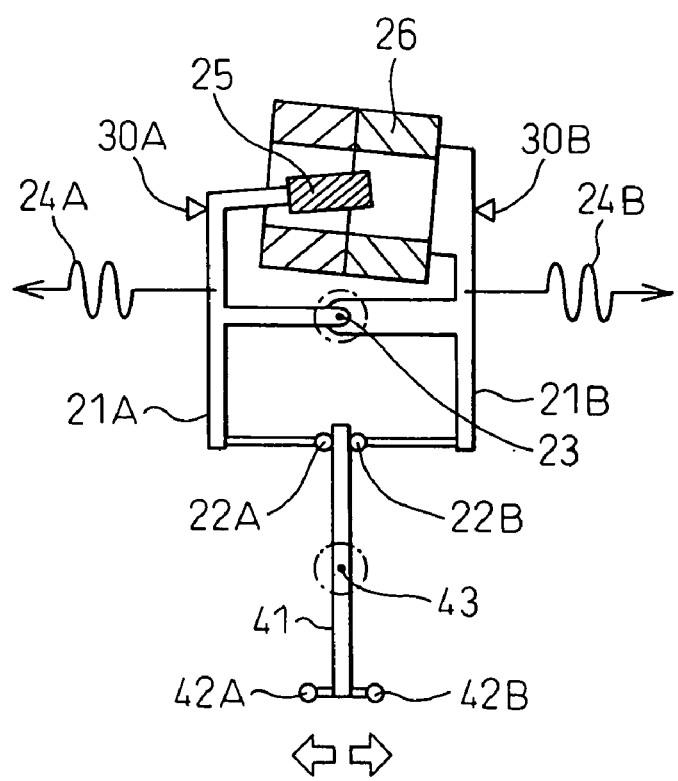
FIG. 10 is a schematic configuration diagram of a displacement detector in a fourth embodiment of the present invention.

FIG. 10 is a diagram showing a schematic configuration of a displacement detector in a fourth embodiment of the present invention and FIG. 11A and FIG. 11B are diagrams showing how it is used.

As shown in FIG. 10, the displacement detector in the fourth embodiment of the present invention comprises a contact arm 41 supported rotatably at a fulcrum of extension and rotation 43, first and second contacts 42A and 42B extending in 180 degrees different directions from one end of the contact arm 41, the first and second arms 21A and 21B supported rotatably at the fulcrum of rotation 23 and one end 22A and one end 22B thereof respectively come into contact with the other end of the contact arm 41, the core (first detection element) 25 provided at the other end of the first arm 21A and moving on an arc with the fulcrum of rotation 23 as its center in accordance with the rotation of the first arm 21A, the bobbin (second detection element) 26 provided at the other end of the second arm 21B and moving on an arc with the fulcrum of rotation 23 as its center in accordance with the rotation of the second arm 21B in such a manner as to accommodate the core 25 inside thereof, the first spring 24A that biases the first arm 21A, the second spring 24B that biases the first arm 21B, the first stopper 30A that limits the range in which the first arm 21A rotates using the first spring 24A, and the second stopper 30B that limits the range in which the second arm 21B rotates using the second spring 24B. The detection section that generates a signal to detect the position of the core 25 with respect to the bobbin 26 in the differential transformer consisting of the core 25 and the bobbin 26 is not shown schematically. In addition, the fulcrum of extension and rotation 43 is also provided on the case, not shown schematically.

In the fourth embodiment, a state in which the first arm 21A shown in FIG. 10 is in contact with the first stopper 30A, the second arm 21B is in contact with the second stopper 30B, and both the front end 22A of the first arm 21 and the front end 22B of the second arm 21B are in contact with the other end of the contact arm 41 is referred to as a reference rotation position. When the contact arm 41 rotates from the reference rotation position so that the contact 42A moves toward the right side, the first arm 21A rotates so that the front end 22A moves toward the left side. In addition, when the contact arm 41 rotates so that the contact 42B moves toward the left side, the second arm 21B rotates so that the front end 22B moves toward the right side.

The differential transformer consisting of the core 25 and the bobbin 26 is set so that it is near the end of the detectable range when the contact arms 41 and the arms 21A and 21B are at the reference rotation position and moves toward the middle of the detectable range when the contact arm 41 rotates in either direction and the arm 21A or the arm 21B rotates from the reference rotation position.

When the surface roughness or surface shape of the surface A on the right side of the work W is measured using the displacement detector in the fourth embodiment, a setting is provided so that the contact 42A comes into contact with the surface A on the right side of the work A in a state in which the contact arm 41 has been rotated so that the contact 42A moves toward the right side from the reference rotation position, and in response to this, the first arm 21A has rotated, as shown in FIG. 11A. In this setting, the spring 24A biases the first arm 21A so that the front end 22A moves toward the right side and due to this, the contact arm 41 is biased so that the contact 42A moves toward the left side. The biasing force serves as a contact pressure of the contact 42A against the surface A. At this time, the second arm 21B is in contact with the stopper 30B and in a state in which it remains at the reference rotation position, not moving therefrom. This state is within the detectable range of the differential transformer consisting of the core 25 and the bobbin 26 and the position of the core 25 with respect to the bobbin 26, that is, the angle of rotation of the first arm 21A, and further, that is, the angle of rotation of the contact arm 41 and the position (displacement) of the contact 42A, are detected by the differential transformer.

When the surface roughness or surface shape of the surface B on the left side of the work W is measured, a setting is provided so that the contact 42B comes into contact with the surface B on the right side of the work W in a state in which the contact arm 41 has been rotated so that the contact 42B moves toward the left side from the reference rotation position, and in response to this, the second arm 21B has rotated, as shown in FIG. 11B. In this setting, the spring 24B biases the second arm 21B so that the front end 22B moves toward the left side and due to this, the contact arm 41 is biased so that the contact 42B moves toward the right side. The biasing force serves as a contact pressure of the contact 42B against the surface B. At this time, the first arm 21A is in contact with the stopper 30A and in a state in which it remains at the reference rotation position, not moving therefrom. This state is within the detectable range of the differential transformer consisting of the core 25 and the bobbin 26 and the position of the core 25 with respect to the bobbin 26, that is, the angle of rotation of the second arm 21B, and further, that is, the angle of rotation of the contact arm 41 and the position (displacement) of the contact 42B, are detected by the differential transformer.

As described above, with the displacement detector in the fourth embodiment, it is possible to set the measurement direction by causing the contact to come into contact with the work surface in a state in which the contact arm 41 has been rotated from the reference rotation position in either direction. The detectable range of the displacement detector in the fourth embodiment is the detectable range of the differential transformer consisting of the core 25 and the bobbing 26 when the contact arm 41 is rotated in whichever direction.

The embodiments of the present invention are described as above, however there can be various modification examples, and as described above, application is also possible for various detection systems, such as a grating interferometer, and those in the art can conceive of various modifications for the shape of the arms, along with arrangement of springs and stoppers.

INDUSTRIAL APPLICABILITY

The present invention is particularly effective when applied to a displacement detector used when a measurement is made completely automatic, because switching of directions of measurement can be done without manual operation.

I claim:

1. A displacement detector, comprising:
   an arm supported rotatably at a fulcrum of rotation;
   first and second contacts extending substantially 180 degrees in different directions from one end of the arm;
   first and second movable detection elements provided so that they extend substantially 180 degrees in different directions from the other end of the arm and move on an arc with the fulcrum of rotation as its center in accordance with the rotation of the arm;
   first and second fixed detection elements provided so that the respective relative positional relationships change in accordance with the movement of the first and second movable detection elements;
   a detection section that generates, when the first and second movable detection elements are within predetermined positional relationship ranges with respect to the first and second fixed detection elements, respectively, detection signals in accordance with the respective positional relationships; and an arm biasing means for biasing the arm so that it rotates toward a reference rotation position, the means biasing the arm in the opposite direction in accordance with the direction of rotation from the reference rotation position, wherein:

when the arm rotates toward one side from the reference rotation position, the first movable detection element is within the predetermined positional relationship range with respect to the first fixed detection element and the detection section generates a detection signal in accordance with the positional relationship of the first movable detection element with respect to the first fixed detection element; and when the arm rotates toward the other side from the reference rotation position, the second movable detection element is within the predetermined positional relationship range with respect to the second fixed detection element and the detection section generates a detection signal in accordance with the positional relationship of the second movable detection element with respect to the second fixed detection element.

2. A displacement detector comprising:

an arm supported rotatably at a fulcrum of rotation;

first and second contacts extending in substantially 180 degrees different directions from one end of the arm;

a movable detection element provided at the other end of the arm so that it moves on an arc with the fulcrum of rotation as its center in accordance with the rotation of the arm;

a fixed detection element provided so that the relative positional relationship changes in accordance with the movement of the movable detection element;

a detection section that generates a detection signal in accordance with the positional relationship when the movable detection element is within a predetermined positional relationship range with respect to the fixed detection element; and an arm biasing means for biasing the arm so that it rotates toward a reference rotation position, the means biasing the arm in the opposite direction in accordance with the direction of rotation from the reference rotation position, wherein when the arm is at the reference rotation position, the movable detection element is situated substantially in the middle of the predetermined positional relationship range with respect to the fixed detection element.

3. A displacement detector comprising:

first and second arms supported rotatably at a fulcrum of rotation;

a first contact extending from one end of the first arm;

a second contact extending from one end of the second arm;

a first detection element provided at the other end of the first arm and moving on an arc with the fulcrum of rotation as its center in accordance with the rotation of the first arm;

a second detection element provided at the other end of the second arm and moving on an arc with the fulcrum of rotation as its center so that the relative positional relationship changes with respect to the first detection element in accordance with the rotation of the second arm;

a detection section that generates a detection signal in accordance with the positional relationship when the first detection element is within a predetermined positional relationship range with respect to the second detection element;

a first biasing means for biasing the first arm toward the direction in which the first contact extends;

a second biasing means for biasing the second arm toward the direction in which the second contact extends;

a first stopper for limiting the range in which the first arm rotates using the first biasing means; and a second stopper for limiting the range in which the second arm rotates using the second biasing means, wherein:

a reference rotation position is a state in which the rotation of the first arm is limited by the first stopper and the rotation of the second arm is limited by the second stopper;

when the first arm rotates from the reference rotation position in the state in which the rotation of the second arm is limited by the second stopper, the positional relationship of the first detection element with respect to the second detection element is within the predetermined positional relationship range; and when the second arm rotates from the reference rotation position in the state in which the rotation of the first arm is limited by the first stopper, the positional relationship of the first detection element with respect to the second detection element is within the predetermined positional relationship range.

4. A displacement detector comprising:

a contact arm supported rotatably at a fulcrum of extension and rotation;

first and second contacts extending in substantially 180 degrees different directions from one end of the contact arm;

first and second arms supported rotatably at a fulcrum of rotation and each one end of which comes into contact with the other end of the contact arm;

a first detection element provided at the other end of the first arm and moving on an arc with the fulcrum of rotation as its center in accordance with the rotation of the first arm;

a second detection element provided at the other end of the second arm and moving on an arc with the fulcrum of rotation as its center so that the relative positional relationship with respect to the first detection element changes in accordance with the rotation of the second arm;

a detection section that generates a detection signal in accordance with the positional relationship when the first detection element is within a predetermined positional relationship range with respect to the second detection element;

a first biasing means for biasing one end of the first arm toward a first direction;

a second biasing means for biasing one end of the second arm toward a second direction;

a first stopper for limiting the range in which the first arm rotates using the first biasing means; and a second stopper for limiting the range in which the second arm rotates using the second biasing means, wherein:

a reference rotation position, at which one end of each of the first and second arms is in contact with the other end of the contact arm, is a state in which the rotation of the first arm is limited by the first stopper and the rotation of the second arm is limited by the second stopper;

when the contact arm rotates from the reference rotation position toward a first direction, the other end of the contact arm rotates one end of the first arm toward a second direction and the positional relationship of the first detection element with respect to the second detection element is within the predetermined positional relationship range; and when the contact arm rotates from the reference rotation position toward the second direction, the other end of the contact arm rotates one end of the second arm toward the first direction and the positional relationship of the first detection element with respect to the second detection element is within the predetermined positional relationship range.

* * * * *